Miller & Flender,

Fender.

No. 105,231.   Patented July 12, 1870.

Witnesses:
John Becker
D. S. Mabee

Inventor:
J. Miller
W. B. H. Flender
Per Munn & Co.
Attorneys.

United States Patent Office.

JACOB MILLER AND WILLIAM H. B. FLENDER, OF WASHINGTON, PENNSYLVANIA.

Letters Patent No. 105,231, dated July 12, 1870.

COMBINED FENDER AND FIRE-SCREEN.

The Schedule referred to in these Letters Patent and making part of the same.

*To all whom it may concern:*

Be it known that we, JACOB MILLER and WILLIAM H. B. FLENDER, of Washington, in the county of Washington and State of Pennsylvania, have invented a new and useful Improvement in Combined Fender and Fire-Screen; and we do hereby declare that the following is a full, clear, and exact description thereof, which will enable others skilled in the art to make and use the same, reference being had to the accompanying drawing forming part of this specification, in which—

Similar letters of reference indicate corresponding parts.

Our invention has for its object to furnish an improved fender and fire-screen, which shall be so constructed that the fire-screen may be conveniently folded down when not required for use, giving the combined article the appearance of an ordinary fender; and It consists in the construction and combination of the various parts, as hereinafter more fully described.

A are the side and ends of the fender, upon the inner side of the end parts of which are formed lugs, $a'$, to which are pivoted the end plates, B, of the fire-screen.

Figure 1:
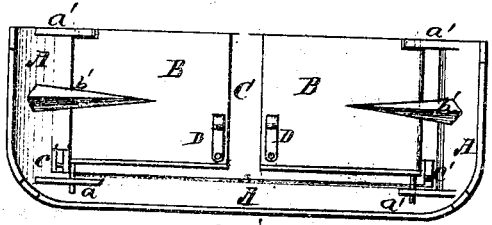
Figure 1 is an under-side view of our improved fender and fire-screen.
Figure 2:
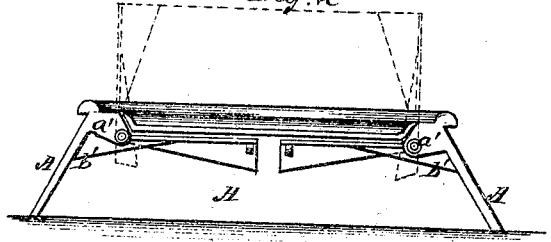
Figure 2 is a rear view of the same, the fire-screen being folded down, and showing, in dotted lines, the top plate raised.
Figure 3:
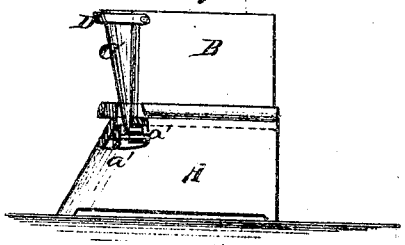
Figure 3 is an end view of the same, the fire-screen being raised, and part being broken away to show the construction.

Upon the middle part of the hinged end plates B are formed lugs or arms $b'$, which, when the said plates are folded down into a horizontal position, as shown in figs. 1 and 2, rests against the ends of the fender A, to prevent the said plates from dropping down too far.

C is the top plate of the fender, which, when turned up, forms the front of the fire-screen.

Upon the edge of the plate C are formed hooked lugs, $c'$, which pass through holes in the narrow flange formed around the inner side of the upper part of the fender A, to hinge the said plate C to the said fender A, the said lugs holding the said plate securely in either position.

The plates B B C are connected to each other and held securely in position, when raised, by buttons D, or by spring bolts, clasps, hooks, and staples, or other convenient means.

By this construction the article may, in a moment, be adjusted for use as a fender or fire-screen, as may be required, and will present a neat and finished appearance under either adjustment.

Having thus described our invention,

We claim as new and desire to secure by Letters Patent—

A combined fender and fire-screen, formed by the combination of the fender A $a'$, pivoted end plates B $b'$, and pivoted or hinged top plate C $c'$, with each other, substantially as herein shown and described, and for the purpose set forth.

JACOB MILLER.
WILLIAM H. B. FLENDER.

Witnesses:
JOHN GRAYSON, Jr.,
WM. J. COOL.